(12) United States Patent
Nakano

(10) Patent No.: US 9,553,857 B2
(45) Date of Patent: Jan. 24, 2017

(54) COMMUNICATION SYSTEM, COMMUNICATION APPARATUS, COMMUNICATION METHOD, AND COMPUTER PROGRAM

(71) Applicant: SONY CORPORATION, Tokyo (JP)

(72) Inventor: Takehiko Nakano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/587,678

(22) Filed: Dec. 31, 2014

(65) Prior Publication Data

US 2015/0156182 A1 Jun. 4, 2015

Related U.S. Application Data

(63) Continuation of application No. 13/810,792, filed as application No. PCT/JP2011/062739 on Jun. 2, 2011, now Pat. No. 8,949,605.

(30) Foreign Application Priority Data

Jul. 29, 2010 (JP) .................................. 2010-171184

(51) Int. Cl.
*H04L 29/06* (2006.01)
*G06F 21/10* (2013.01)
(Continued)

(52) U.S. Cl.
CPC ............ *H04L 63/068* (2013.01); *G06F 21/10* (2013.01); *G06F 21/445* (2013.01); *H04L 9/088* (2013.01);
(Continued)

(58) Field of Classification Search
CPC .... H04L 63/068; H04L 9/3271; H04L 63/061; H04L 9/0819; G06F 21/10; G06F 21/445
See application file for complete search history.

(56) References Cited

U.S. PATENT DOCUMENTS

2002/0194010 A1* 12/2002 Bergler ................ G06Q 50/184
                                                                   705/310
2006/0274899 A1* 12/2006 Zhu ........................ H04L 9/083
                                                                   380/281
(Continued)

FOREIGN PATENT DOCUMENTS

JP          9-73565          3/1997
JP       2002-84274          3/2002
(Continued)

OTHER PUBLICATIONS

Office Action issued Jul. 21, 2015 in Japanese Patent Application No. 2014-217692.
(Continued)

*Primary Examiner* — Amir Mehrmanesh
(74) *Attorney, Agent, or Firm* — Oblon, McClelland, Maier & Neustadt, L.L.P.

(57) ABSTRACT

Content is transmitted within a range of the user's legitimate use while limiting the number of equipment to which the content is transmitted at the same time.

A content using apparatus periodically transmits an exchange key and the corresponding key ID using a command. Only while receiving the key ID at predetermined reception cycles, a content providing apparatus maintains the corresponding exchange key. When not periodically receiving the key ID, the content providing apparatus destroys the corresponding exchange key. After that, when receiving a command including the key ID, the content providing apparatus returns a response including information indicating that the exchange key has become invalid.

10 Claims, 7 Drawing Sheets

(51) Int. Cl.
  *G06F 21/44* (2013.01)
  *H04L 9/32* (2006.01)
  *H04L 9/08* (2006.01)
(52) U.S. Cl.
  CPC ........... *H04L 9/0819* (2013.01); *H04L 9/0844* (2013.01); *H04L 9/3271* (2013.01); *H04L 9/3273* (2013.01); *H04L 63/061* (2013.01); *H04L 63/0869* (2013.01); *G06F 2221/2103* (2013.01); *G06F 2221/2107* (2013.01); *G06F 2221/2129* (2013.01); *H04L 2209/60* (2013.01)

(56) References Cited

U.S. PATENT DOCUMENTS

| | | | |
|---|---|---|---|
| 2007/0140490 A1* | 6/2007 | Tanabe | H04N 7/1675 380/241 |
| 2007/0180224 A1* | 8/2007 | Nakano | G06F 21/606 713/150 |
| 2008/0178004 A1* | 7/2008 | Wei | H04L 63/0869 713/171 |
| 2009/0210709 A1* | 8/2009 | Fujiwara | H04N 21/2347 713/171 |
| 2011/0179276 A1* | 7/2011 | Hatakeyama | H04L 9/3271 713/171 |

FOREIGN PATENT DOCUMENTS

| | | |
|---|---|---|
| JP | 2002-351564 | 12/2002 |
| JP | 2004-62561 A | 2/2004 |
| JP | 2004-112788 | 4/2004 |
| JP | 2006-323707 | 11/2006 |
| JP | 2007-174249 | 7/2007 |
| JP | 2007-188120 | 7/2007 |
| JP | 2007-272862 | 10/2007 |
| JP | 2009-157848 | 7/2009 |
| JP | 2009-194860 | 8/2009 |

OTHER PUBLICATIONS

Office Action issued Jul. 21, 2015 in Japanese Patent Application No. 2014-190585.
Extended European Search Report issued Dec. 4, 2015 in Patent Application No. 11812159.9.
Japanese Office Action issued Apr. 5, 2016 in corresponding Japanese Application No. 2014-217692 (4 pages).
Japanese Office Action issued Apr. 5, 2016 in corresponding Japanese Application No. 2014-190585 (4 pages).

* cited by examiner

COMMUNICATION SYSTEM, COMMUNICATION APPARATUS, COMMUNICATION METHOD, AND COMPUTER PROGRAM

This is a continuation of U.S. patent application Ser. No. 13/810,792, filed Jan. 17, 2013, which is a U.S. national stage application of International Application No. PCT/JP2011/062739, filed Jun. 2, 2011, which claims the benefit of priority from Japanese Application No. 2010-171184 filed on Jul. 29, 2010. All of the above-referenced applications are herein incorporated by reference in their entireties.

TECHNICAL FIELD

The present invention relates to a communication system, a communication apparatus, a communication method, and a computer program for preventing an illegal use in a content transmission and, in particular, to a communication system, a communication apparatus, a communication method, and a computer program for transmitting encrypted content after exchanging the decryption key of the encrypted content according to a predetermined mutual authentication and key exchange (AKE) algorithm.

BACKGROUND ART

Broadcast content or the content in packaged media has basically been used at the place at which the content using apparatus or a replay equipment is positioned, or at an equipment connected to the apparatus and the equipment through a home network (hereinafter, also referred to as a "local access (LA)") in the past. For example, from technical terms related to a communication channel or a codec, it is difficult to use content, with a transmission through an external network such as a Wide Area Network (WAN) by connecting to the above-mentioned content using apparatus or replay equipment from outside with a mobile equipment (hereinafter, also referred to as a "remote access (RA)"). However, a data communication technology such as a Long Term Evolution (LTE) or a World Interoperability for Microwave Access (WiMAX) and a high-compression codec such as the H.264 are expected to become popular so that using the technology or the codec is likely to make a remote access implementable in the future. For example, the user can remotely access the server of user's home on the go in order to replay content.

It is relatively easy to perform an illegal operation on digital content, for example, copy or falsification. Among others, in a remote access, it is necessary to prevent an illegal use in content transmission in order to protect the copyright of the content while permitting the use of the content for a personal or home purpose.

The Digital Transmission Content Protection (DTCP) developed by the Digital Transmission Licensing Administrator (DTLA) is cited as an industry-standard technology relating to protection for a digital content transmission. An authentication protocol between the equipment in a content transmission and a transmission protocol for encrypted content are prescribed in the DTCP. In summary, the prescription includes that a DTCP-compatible equipment does not transmit an easy-to-use compressed content in an unencrypted state out of the equipment, that the key exchange required to decrypt an encrypted content is conducted according to a predetermined mutual authentication and key exchange (AKE) algorithm, and that the range of equipment among which the key is exchanged according to an AKE command is limited.

Further, the DTCP technology that has been ported to an IP network or, namely, a DTCP-IP (DTCP mapping to IP) can circulate digital content also at home through the IP network. The current DTCP-IP (DTCP volume 1 Specification Supplement E Revision 1.2) mainly intends to secure the use of contents only at home and set limitations on the round trip time (RTT) and the hop number of IP routers or, namely, the Time To Live (TTL) for an AKE command.

For example, there is proposed a information communication system for continuing monitoring each received AKE command and continuing updating the maximum value of the TTL value during the period from the time when a Source starts a DTCP-IP authentication until the time just before the Source completes the authentication, and checking the maximum TTL value just before the completion of the authentication process in order to complete the authentication process with exchanging the key when the maximum value is three or less, or in order to complete the authentication process without performing the process in the final phase when the maximum value exceeds three (for example, see Patent Document 1).

Further, the owner of the content can prohibit a content providing apparatus (Source) from transmitting content to many content using apparatuses (Sinks) at the same time in order to restrict an illegal use of the content.

On the other hand, the user who uses the content can separately use a plurality of content using apparatuses depending on the situation, or a family can share a content providing apparatus positioned at home. In such utility forms, a content transmission from a content providing apparatus to a plurality of content using apparatuses at home is in a range of the legitimate use of content. Thus, if the owner of the content limits the number of apparatuses in order to prohibit a content transmission as described above, it follows that the owner unduly restricts the user's use of the content.

CITATION LIST

Patent Document

Patent Document 1: is Japanese Patent Application Laid-Open No. 2007-36351

SUMMARY OF THE INVENTION

Problems to Be Solved by the Invention

An objective of the present invention is to provide a communication system, a communication apparatus, a communication method, and a computer program that are excellent and capable of preferably transmitting encrypted content after exchanging the decryption key of the encrypted content according to a predetermined mutual authentication and key exchange algorithm.

Another objective of the present invention is to provide a communication system, a communication apparatus, a communication method, and a computer program that are excellent and capable of transmitting content within a range of the user's legitimate use while limiting the number of apparatuses to which content that requires a protection for a copyright or another purpose is transmitted at the same time.

Solutions to Problems

The present application has been made in view of the above problems, and an invention according to claim 1 is a communication system that performs a communication for transmitting content between a content providing apparatus for providing the content and one or more content using apparatuses for using the content, including:

mutual authentication and key exchange means for a mutual authentication and for exchanging a key for encrypting the content between the content providing apparatus and the content using apparatus;

key recording means for recording a key transmitted by the content providing apparatus to each of the content using apparatuses after combining the key with a key ID for specifying the key and an equipment ID for specifying the content using apparatus; and key management means for maintaining information on the key ID in the key recording means only while the content using apparatus periodically transmits a key life management command including the key ID to the content providing apparatus.

Note that the "system" in this case denotes a logical collection of a plurality of apparatuses (or functional modules for implementing a specific function) so that it does not especially make any difference whether each equipment and function module is provided at a chassis.

An invention according to claim 2 of the present application is a communication apparatus including:

mutual authentication and key exchange means for a mutual authentication and for exchanging a key for encrypting content with one or more content using apparatuses that are to be destinations of the content;

key recording means for recording a key transmitted to each of the content using apparatuses after combining the key with a key ID for specifying the key and an equipment ID for specifying the content using apparatus; and key management means for maintaining information corresponding to the key ID in the key recording means only while a key life management command including the key ID is received from the content using apparatus at predetermined reception cycles.

In an invention according to claim 3 of the present application, the key management, means of the communication apparatus according to claim 2 is configured to destroy, from the key recording means, information corresponding to a key ID of which key life management command has not been received at the predetermined reception cycles.

In an invention according to claim 4 of the present application, the key management means of the communication apparatus according to claim 2 is configured to, in response to receiving the key life management command from the content using apparatus, return a response indicating that the key is valid when the information corresponding to the key ID included in the received key life management command is maintained in the key recording means, and return a response indicating that the key is invalid after the corresponding information has been destroyed from the key recording means.

In an invention according to claim 5 of the present application, the key management means of the communication apparatus according to claim 2 is configured to, in response to receiving a key life management command on which information indicating destruction of the key is set, destroy information corresponding to the key from the key management means.

In an invention according to claim 6 of the present application, the communication apparatus according to claim 2 further includes registration means for pre-registering a content using apparatus with which a key is to be exchanged. The key management means is configured to, in response to receiving a key life management command from a content using apparatus that has not been pre-registered in the registration means, return a response indicating absence of the registration.

An invention according to claim 7 of the present application is a communication apparatus including:

mutual authentication and key exchange means for a mutual authentication and for exchanging a key for encrypting content with a content providing apparatus that is to be a source of the content; and key life management means for transmitting a key life management command including a key ID for specifying the key transmitted from the content providing apparatus by the mutual authentication and key exchange means.

In an invention according to claim 8 of the present application, the key life management means of the communication apparatus according to claim 7 is configured to transmit a key life management command on which information indicating destruction of the key is set when the key becomes unnecessary.

An invention according to claim 9 of the present application is a communication method including:

a mutual authentication and key exchange step for a mutual authentication and for exchanging a key for encrypting content with one or more content using apparatuses that are to be destinations of the content;

a key recording step for recording a key transmitted to each of the content using apparatuses after combining the key with a key ID for specifying the key and an equipment ID for specifying the content using apparatus; and a key management step for maintaining information corresponding to the key ID in the key recording means only while at key life management command including the key ID is received from the content using apparatus at predetermined reception cycles.

An invention according to claim 10 of the present application is a communication method including:

a mutual authentication and key exchange step for a mutual authentication and for exchanging a key for encrypting content with a content providing apparatus that is to be a source of the content; and a key life management step for transmitting a key life management command including a key ID for specifying the key transmitted from the content providing apparatus in the mutual authentication and key exchange step.

Effects of the Invention

According to the invention, there can be provided a communication system, a communication apparatus, a communication method, and a computer program that are excellent and capable of transmitting content within a range of the user's legitimate use while limiting the number of apparatuses to which content that requires a protection for a copyright or another purpose is transmitted at the same time.

According to the invention of the present application, the content using apparatus periodically transmits a key life management command including a key ID to the content providing apparatus at predetermined transmission cycles, and the content providing apparatus maintains the corresponding key only while receiving the key life management command at predetermined reception cycles so that it is possible to limit, to a predetermined number or less, the number of the content using apparatus to which the content providing apparatus can transmit content at the same time.

According to the invention described in claim 4 of the present application, in response to receiving the key life management command, the content providing apparatus returns a response indicating that the key is valid when maintaining the corresponding key. Alternately, the content providing apparatus returns a response indicating that the key is invalid when receiving the command after the content providing apparatus has destroyed the corresponding key because not receiving the key life management command at predetermined reception cycles. Thus, the content using apparatus can confirm the current status of its own key.

According to the invention described in claims 5 and 8 of the present application, the content using apparatus sets the information indicating the key is unnecessary on the key life management command corresponding to the unnecessary key, and the content providing apparatus, in response to receiving the key life management command on which the information indicating the key is unnecessary is set, destroys the corresponding key so that the content providing apparatus can newly exchange a key with other content using apparatuses within the upper limit of the number of the content using apparatuses.

According to the invention described in claim 6 of the present application, the content providing apparatus can pre-register a content using apparatus with which a key is to be exchanged, for example, in response to the request of the owner of the content. The content providing apparatus, in response to receiving the key life management command from a content using apparatus that has not been pre-registered, returns a response indicating that the key has not been registered so that the content using apparatus can confirm the absence of registration of itself.

Other objectives, features, and advantages of the present invention will be apparent from the detailed description based on the embodiments of the present invention described below and the accompanying drawings.

MODE FOR CARRYING OUT THE INVENTION

Hereinafter, embodiments of the present invention will be described with reference to the drawings.

The present invention relates to a communication system for safely transmitting content via a remote access (RA) through an external network such as a WAN. The communication system basically includes a server configured to provide content, via the remote access (RA-Source) and a client configured to request content via the remote access (RA-Sink). Herein, an AKE procedure performed at a remote access will be referred to as an "RA-AKE". Hereinafter, embodiments of the present invention will be described in detail with reference to the drawings.

Figure 1:
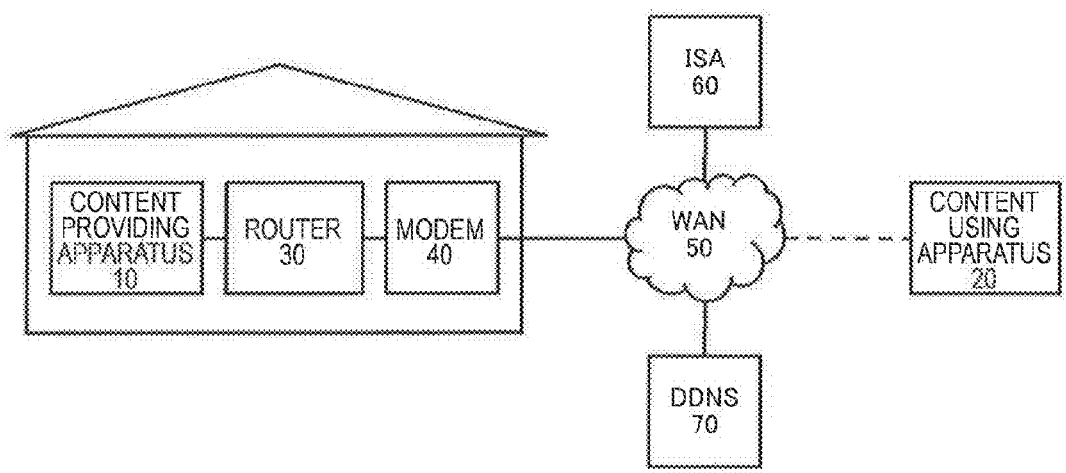
FIG. 1 is a schematic view of an exemplary structure of a communication system according to the present invention.

FIG. 1 schematically illustrates an exemplary structure of a communication system according to the present invention. In the communication system illustrated in the drawing, a content providing apparatus 10 corresponding to the RA-Source is positioned at home, and a content using apparatus 20 corresponding to the RA-Sink is positioned at the outside. Then, the content using apparatus 20 remotely accesses the content providing apparatus 10 with a communication function such as a mobile phone.

The content providing apparatus 10 is generally connected to an external network such as a WAN 50 through a router 30 and a modem 40. The WAN 50, for example, is the Internet. An IP address of the WAN 50 side is allocated to the router 30 from an Internet Access Service (IAS) provider 60 for which the user signs up. Basically, the content using apparatus 20 also accesses the IP address. The router 30 allocates a private IP address to the content providing apparatus 10, and relays the communication of the access from the WAN 50 by port forwarding. Note that, in the case where the IP address to be allocated to the router 30 is updated by the IAS provider 60, a DDNS service 70 is used in that case for using the Dynamic Domain Name System (DNS) (DDNS) functions of the router 30 to the content providing apparatus 10 in order to accept the update.

Figure 2:
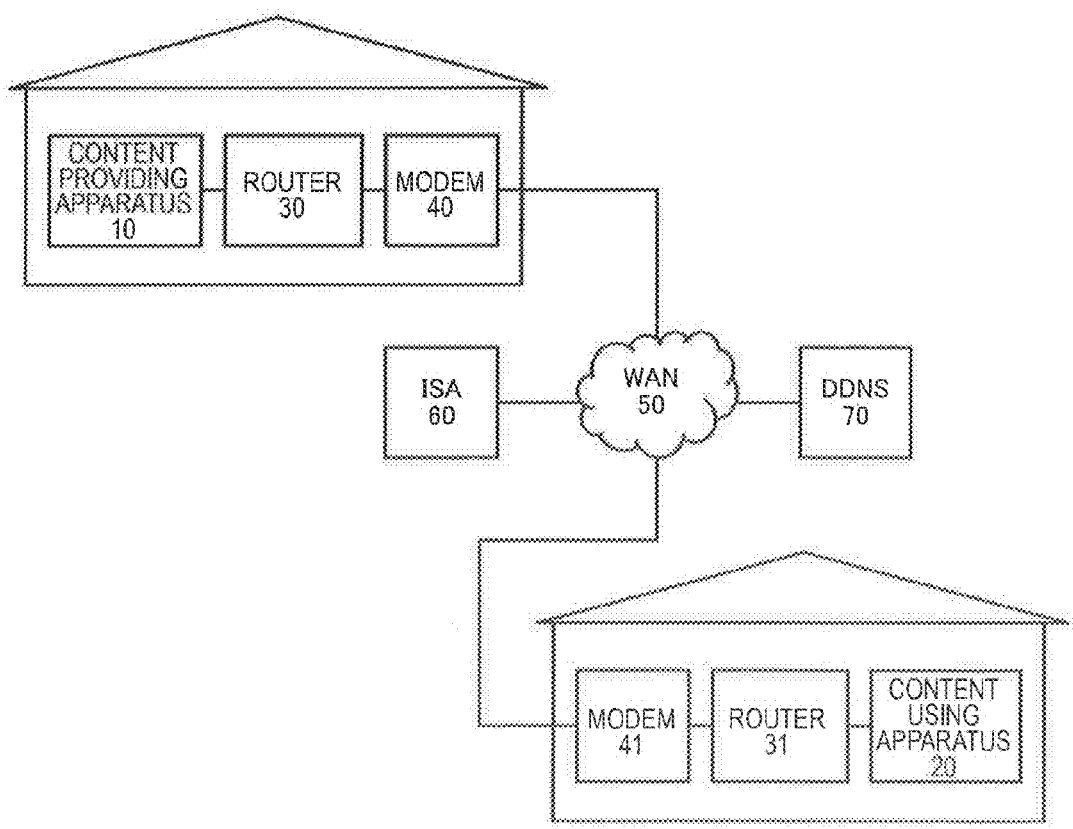
FIG. 2 is a schematic view of anther exemplary structure of the communication system according to the present invention.

Further, FIG. 2 schematically illustrates another exemplary structure of the communication system according to the present invention. In the communication system illustrated in the drawing, a content using apparatus 20 corresponding to the RA-Sink is also positioned at home, and is connected to a WAN 50 through a router 31 and a modem 41. The address of a Transmission Control Protocol/Internet Protocol (TCP/IP) communication that is transmitted from the content using apparatus 20 is changed by the Network Address Translation (NAT) function of the router 31. However, other than that, the case illustrated in FIG. 2 is the same as the case illustrated in FIG. 1.

Figure 3:
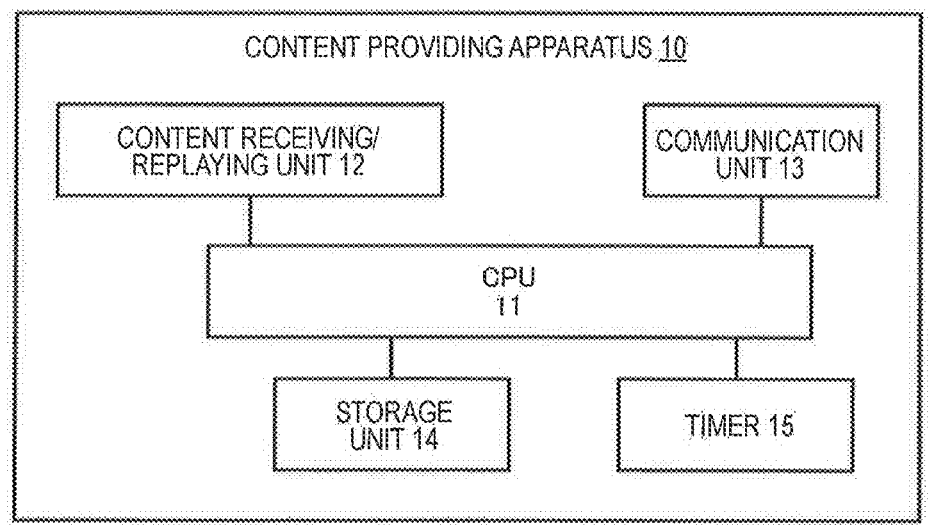
FIG. 3 is a schematic view of a functional structure of a content providing apparatus 10.

FIG. 3 schematically illustrates a functional structure of the content, providing apparatus 10. The content providing apparatus 10 includes a Central Processing Unit (CPU) 11, a content receiving/replaying unit 12, a communication unit 13, a storage unit 14, and a timer 15 in order to function as the RA-Source and transmit content via a remote access.

The content receiving/replaying unit 12 includes a broadcast receiving function, and a packaged media replaying function. The CPU 11 provides a proper protection to a remotely-accessible content among the content obtained in the content receiving/replaying unit 12, and then transmits the content, through the communication unit 13, to the RA-Sink (the content using apparatus 20) on which the mutual authentication and key exchange has been performed according to the RA-AKE.

The storage unit 14 stores, for example, one identification data of the RA-Sink that is determined to be stored by the registration process described below, the exchange key for a remote assess that has been shared by the RA-Sink through the RA-AKE, and the identification data of the key (hereinafter, also referred to as a "key ID"). In the present embodiment, the number of sets of the exchange key and the key ID that can simultaneously be registered is limited to n (note that the n is a positive integer). A connection table and a receiving equipment table described below are also stored in the storage unit 14. The storage unit 14 can further be used for the purpose for storing content obtained by the content receiving/replaying unit 12.

The timer 15 is used when a time management is necessary (for example, when the reception cycle of the key ID from the RA-Sink is managed as described below) while a remotely-accessible content is handled.

Figure 4:
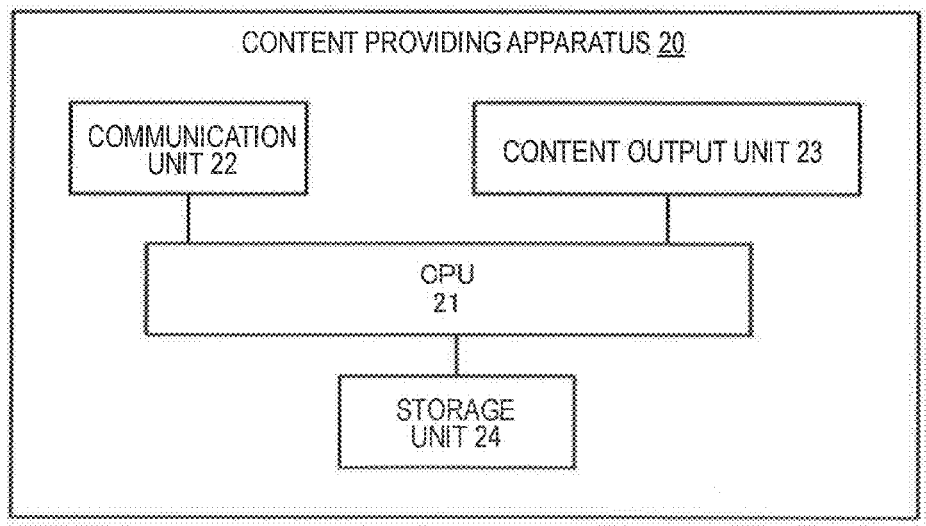
FIG. 4 is a schematic view of a functional structure of a content using apparatus 20.

FIG. 4 schematically illustrates a functional structure of the content using apparatus 20. The content using apparatus 20 includes a CPU 21, a communication unit 22, a content output unit 23, and a storage unit 24 in order to function as the RA-Sink and receive content via a remote access.

The content using apparatus 20 as the RA-Sink performs the RA-AKE in order to obtain an exchange key from the RA-Source, stores the key in the storage unit 24, decrypt the encrypted content that has been obtained from the RA-Source using an encryption key calculated based on the exchange key, and output the content from the content output unit 23, in addition to performing the registration process of the exchange key and the key ID described below on the RA-Source (the content providing apparatus 10) through the communication unit 22. The storage unit 24 is used for the purpose for storing the exchange key and the content that has been received from the RA-Source.

A timer 25 is used when a time management is necessary (for example, when the transmission cycle of the key ID from the RA-Source is managed as described below) while a remotely-accessible content is handled.

It is assumed in the description below that the method for calculating the encryption key from the exchange key is according to the DTCP-IP (note that the gist of the present invention is not necessarily limited to the method).

Figure 5:
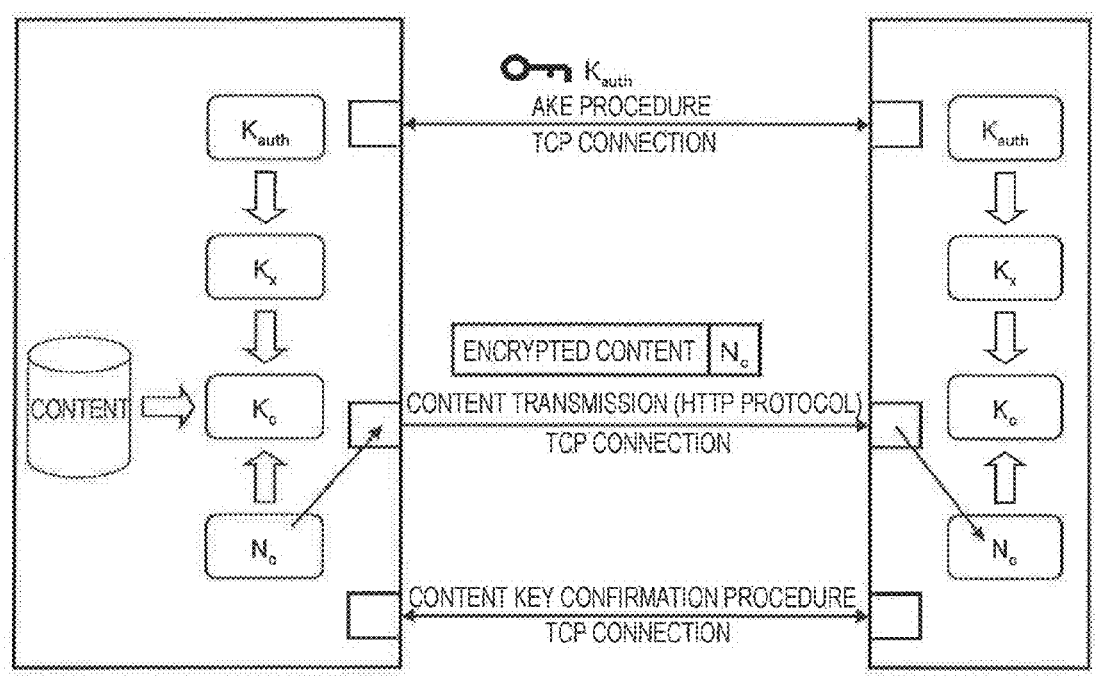
FIG. 5 is a view for describing a mechanism for transmitting encrypted content between a Source and a Sink according to the DTCP-IP.

Here, the mechanism tor transmitting encrypted content according to the DTCP-IP between the Source corresponding to a content providing apparatus and the Sink corresponding to a content using apparatus will be described with reference to FIG. 5 (note that the mechanism between the RA-Source and the RA-Sink is the same as the mechanism). While the forms of content transmission include a method to copy the content on the Source onto the Sink, and a method to move the content from the Source to the Sink in order not to leave the content in the Source (widely-known), the mechanism will be described in the drawing on the premise of the former method for transmitting content by copying.

First, the Source and the Sink establish a TCP/IP connection in order to authenticate each other's equipment (AKE procedure). An equipment certificate issued by the DTLA (mentioned above) is embedded in the DTCP-compatible equipment. In the AKE procedure, after the equipment confirms each other to be a legitimate DTCP-compatible equipment, the Source and the Sink can share an authentication key $K_{auth}$.

When the AKE procedure has succeeded, the Source generates an exchange key $K_x$ that becomes a seed of content key $K_c$ in order to encrypt the key with the authentication key $K_{auth}$ and transmit the exchange key to the Sink. Applying a predetermined calculation process to the exchange key $K_x$ in each of the Source and the Sink can generate the content key $K_c$ used for encrypting content when the content is transmitted.

After the authentication and key exchange procedure between DTCP-compatible equipment according to the AKE has been completed, the transmission of the content is started using a protocol such as a Hyper Text Transfer Protocol (HTTP) or a Real Time Protocol (RTP). In the example illustrated in the drawing, the content is transmitted according to the HTTP procedure. At that time, a TCP/IP connection for the HTTP is created separately from the TCP/IP connection for the AKE procedure (in other words, each of the Source and the Sink has different socket information (sets of an IP address and a port number) for the AKE procedure and for a content transmission).

There are two ways to transmit content according to the HTTP protocol. One is a download style in which the Sink requests content from the Source and the other is an upload style in which content is pushed from the Source side to the Sink. In the former style, the Sink as an HTTP client requests content from the Source as an HTTP server, for example, by an HTTP request using an HTTP GET method, and, in response, the requested content is transmitted from the Source as the HTTP response. On the other hand, in the latter style, the Source as an HTTP client starts a transmission with the Sink as an HTTP server, for example, by an HTTP request using an HTTP POST method.

The data transmitted from the Source is derived from content that has been encrypted using the key shared after the AKE authentication by the Source. Concretely, the Source generates a nonce $N_c$ using a random number in order to generate a content key $K_c$ according to the exchange key $K_x$, the nonce $N_c$ and an encryption mode. Then, the Source encrypts the content requested by the Sink using the content key $K_c$ in order to transmit a packet that includes a payload including the encrypted content and a header including information about the nonce $N_c$ and the encryption mode on a TCP stream. The IP protocol divides the TCP stream into the size to become a predetermined unit, and further adds a header part to the divided stream in order to get an IP packet and transmit the packet to a designated IP address.

At the Sink side, when each IP packet from the Source is received, the packets are assembled into a TCP stream. Then, the nonce $N_c$ and an E-EMI are extracted from the stream, and then a content key $K_c$ is calculated using the nonce $N_c$ and the E-EMI, and the exchange key $K_x$, so that the encrypted content can be decrypted using the content key $K_c$. Then, the decrypted plain text content can be replayed. On the other hand, the Sink does not decrypt the encrypted content and stores the content in the storage unit 24 or passes the content to the other equipment. When the content transmission using the HTTP protocol as described above is completed, the TCP connection used for the content transmission is properly cut, for example, from the Sink side. (In the DTCP-IP, the transmission of the copy control information associated with the content is implemented by two mechanisms. One is an Extended Encryption Mode Indicator (E-EMI) for indication at the header part of a packet and the other is an Embedded Copy Control Information (CCI).)

Note that the destruction of the exchange key $K_x$ before the continuous disuse time exceeds a predetermined period (for example, two hours) is prescribed in the DTCP-IP. If the Sink cannot, obtain the latest exchange key $K_x$ from the Source, the Sink cannot use the encrypted content. Further, the methods to use the exchange key $K_x$ include a method in which a key is prepared at each Sink, and a method in which a key is used regardless of the Sinks. In the present embodiment, an exchange key $K_x$ is prepared at each of the Sinks and identification data (key ID) is allocated to each exchange key $K_x$.

Figure 6:
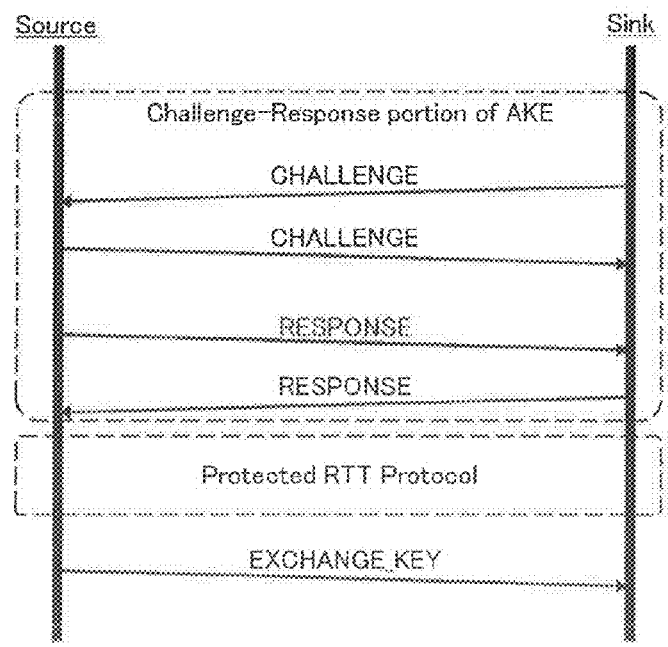
FIG. 6 is a view for illustrating an operation sequence that is for a mutual authentication and key exchange using an AKE command and that is performed between a Source and a Sink according to the current DTCP-IP.

FIG. 6 illustrates an operation sequence that is for a mutual authentication and key exchange using an AKE command and that is performed between the Source corresponding to a content providing apparatus and the Sink corresponding to a content using apparatus according to the current DTCP-IP (RTT-AKE).

At the Challenge-Response portion of AKE, first, an Rx challenge including an Rx random number and an Rx certificate is transmitted from, the Sink requesting content. On the other hand, the Source returns a Tx challenge including a Tx random number and a Tx certificate. After that, an Rx response including the Rx random number, a Tx message, and a Tx signature is transmitted from the Source, and a Tx response including the Tx random number, an Rx message, and an Rx signature is transmitted from the Sink in order to continue a normal challenge-response authentication procedure. Each challenge command of the commando transmitted at the challenge-response portion includes the Device ID that is equipment-specific identification data.

At the above-mentioned response procedure in the Challenge-Response, the TTL (the hop number of the IP routers) is limited. In other words, according to the current DTCP-IP, the TTL in the TCP/IP communication for transmitting a command used in the AKE is set as three or less in the transmitting equipment, and the receiving equipment needs to disable the received data when the TTL is larger than three.

After that, an EXCHANGE_KEY command is transmitted from the Source to the Sink through a Protected RTT Protocol and, in response, a response (not shown in the drawing) is returned from the Sink.

In the RTT-AKE according to the current DTCP-IP illustrated in FIG. 6, an upper limit of the round-trip time (RTT) and the hop number of IP routers (TTL) is set on the AKE command in order to restrict the range where content can be transmitted through the IP network. Depending on the owner of content, an upper limit is set on the number of a content using apparatuses (RA-Sinks) to which a content providing apparatus (RA-Source) transmits context at the same time in order to further restrict an illegal use of the content.

However, the user who uses the content can separately use a plurality of content using apparatuses (RA-Sinks) depending on the situation, or a family can share content, providing apparatus (RA-Source) positioned at home. A content transmission from a content providing apparatus to a plurality of content, using apparatuses at home is in a range of the legitimate use of content. Thus, if the owner of the content limits the number of content using apparatuses in order to prohibit a content transmission as described above, it follows that the owner unduly restricts the user's use of the content.

In light of the foregoing, the communication system according to the present embodiment introduces a mechanism to secure the legitimate use of content by the user while responding to the request of content protection by the owner of the content by means of setting the upper limit of the number of content using apparatuses to which a content providing apparatus transmits content at the same time as n (note that the n is a positive integer), and properly switching the content using apparatuses included in the upper limit n without a special switching operation by the user.

To limit, to a predetermined number or less, the number of content using apparatuses to which a content providing apparatus can transmit content at the same time, the content using apparatus transmits an exchange key and a corresponding key 10 to the content providing apparatus using a command at each of predetermined transmission cycles. Then, the content providing apparatus stores the corresponding exchange key only while receiving the key ID at each of predetermined reception cycles. On the other hand, when not receiving a command including the key ID at the predetermined reception cycles, the content providing apparatus destroys the corresponding exchange key. While the destruction of the exchange key $K_x$ before the continuous disuse time exceeds a predetermined period is prescribed in the DTCP-IP (as described above), the content providing apparatus destroys the corresponding exchange key once the content providing apparatus cannot periodically receive the command including the key ID even within two hours in the present embodiment.

When receiving the command including the key ID, the content providing apparatus confirms whether to store the corresponding exchange key. When the content providing apparatus has received the corresponding command while storing the exchange key, the content providing apparatus returns a response including information indicating that the exchange key is valid to the source content using apparatus. On the other hand, when the content providing apparatus has received the command after destroying the corresponding exchange key because the content providing apparatus has not received the command including the key ID at the predetermined reception cycles, the content providing apparatus returns a response including information indicating that the exchange key is invalid to the source content, using apparatus.

Further, when the content providing apparatus has received the command including the corresponding key ID after destroying the exchange key because the content providing apparatus has not periodically received the command including the key ID at the predetermined reception cycles, the content providing apparatus returns a response including information indicating that the exchange key (or the content key generated from the exchange key) is invalid to the source content using apparatus.

Further, when the content using apparatus no longer need the exchange key due to the completion of the communication process with the content providing apparatus, the content using apparatus sets the information indicating that fact on a command to be periodically transmitted. When receiving the command on which the information indicating that the exchange key has been unnecessary has been set, the content providing apparatus destroys the corresponding exchange key.

Further, the content providing apparatus can manage the life of a key only with a content using apparatus that has been registered in advance. The content using apparatus includes an equipment ID for specifying itself in a command to be periodically transmitted and, in response, the content providing apparatus that has received the command confirms whether the content using apparatus corresponding to the equipment ID included in the received command has been registered. When the command source content using apparatus has not been registered, the content providing apparatus returns a response including the information indicating that the content using apparatus has not been registered to the source content using apparatus before confirming whether the exchange key corresponding to the key ID included in the command is valid.

Figure 7:
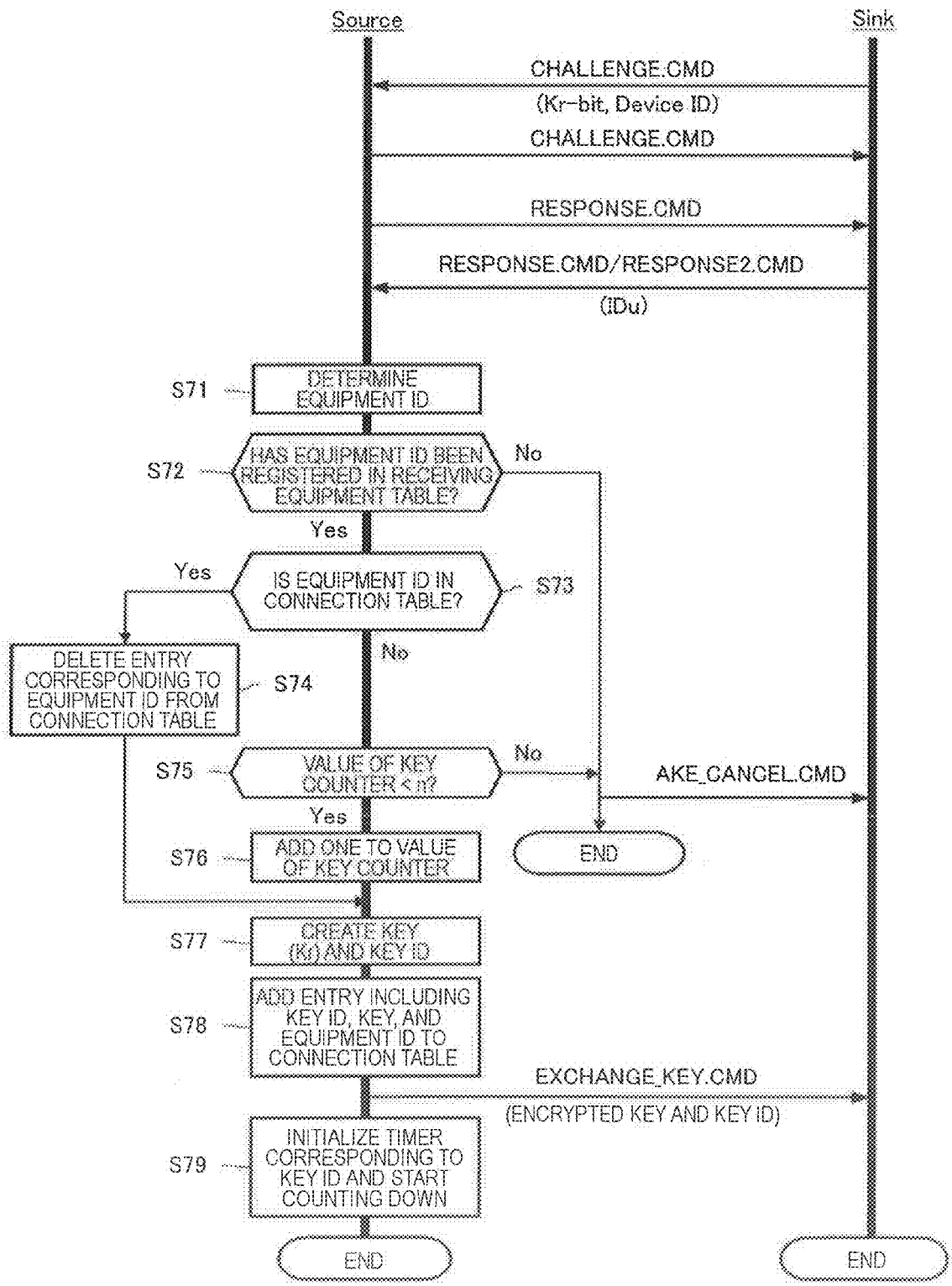
FIG. 7 is a view for illustrating an operation sequence that is for a mutual authentication and key exchange, that includes limiting the number of content using apparatuses to which content can be transmitted at the same time, and that is performed between a Source corresponding to a content providing apparatus and a Sink corresponding to the content using apparatus.

FIG. 7 illustrates an operation sequence that is for a mutual authentication and key exchange, that includes limiting the number of content using apparatuses to which content can be transmitted at the same time, and that is performed between a Source corresponding to a content providing apparatus and a Sink corresponding to a content using apparatus according to the current DTCP-IP. Note that the sequence illustrated in the drawing is mainly used for the Full Authentication process in the DTCP. Further, although it is considered that the operation that is not set in a remote access is general, the upper limits of the round-trip time (RTT) and the hop number of IP routers (TTL) can be set on the AKE command in the same manner as the operation sequence illustrated in FIG. 6. However, it is omitted in the drawings.

When requiring content, the Sink transmits a CHALLENGE command to the Source. At that time, to indicate that the mutual authentication and key exchange procedure is intended to share a key (Kr) for the remote access to the Source, the Sink sets a Kr-bit in the CHALLENGE command. A Device ID that is the specific information on the Sink is also transmitted, in the CHALLENGE command.

After that, based on the Full Authentication protocol in the DTCP, a CHALLENGE command is transmitted from the Source, a RESPONSE command is transmitted from the Sink, and a RESPONSE command or a RESPONSE 2 command is transmitted from the Source in sequence.

Note that, at the Challenge-Response portion, a "RESPONSE 2" is sometimes transmitted as a response from the Sink to the Source. This is conducted when the Device ID does not work as the specific information on the Sink because the equipment implements a Common Device Key and a Common Device Certificate. An ID u transmitted in the RESPONSE 2 command is used as the specific information on the Sink.

The Source determines the equipment ID for specifying the Sink (step S71). The Source uses the ID u as the equipment ID when receiving the RESPONSE 2, and uses the Device ID as the equipment ID when not receiving the RESPONSE 2 command.

When transmitting, to the Sink, the exchange key Kr for the remote access as a result of the mutual authentication and key exchange procedure with the Sink, the Source stores an entry including the set of the exchange key Kr, the key ID for specifying the Kr, and the equipment ID of the Sink in a connection table as described in the following table. It is assumed that as many entries as the limited number of the Sinks to which content can be transmitted at the same time can be stored in the connection table. Although the number of entries is two in the following cable, the limited number is not limited to two in the gist of the present invention.

TABLE 1

| Key ID | Key (Kr) | Equipment ID (Device ID/ID u) |
|---|---|---|
| 1 | 0x9a813f770d469b0e26dc0528 | 0x0000e0cd38 |
| 2 | 0x5762e08f14a9013d8946fe02 | 0x000102187f |

Further, the Source manages a receiving equipment table for a remote access as described in the following table in order to store the equipment IDs of the Sinks to which content is to be transmitted at the same time in the table. When the content of the content requests the pre-registration of the Sink to be remotely accessed, the equipment ID of the Sink is registered in the receiving equipment table in advance. Although the upper limit can be set on the number of the Sinks that can be pre-registered in the receiving equipment table, the gist of the present invention is not limited to a specific upper limit on the number. Note that, as an exemplary method for registering the equipment ID of the Sink in the receiving equipment table, a method in which the Source registers the Sink at the RTT-AKE in the DTCP can be cited.

TABLE 2

| Equipment ID (Device ID/ID u) |
|---|
| 0x0000e0cd38 |
| 0x0000f8024a |
| 0x000102187f |

After determining the equipment ID of the Sink (step S71) in the mutual authentication and key exchange procedure with the Sink as described above, the Source determines whether the equipment ID of the Sink has been registered in the receiving equipment table (step S72). This process is for confirming the registration in the case where the owner of the content requests to pre-register the Sink to be remotely accessed in the Source.

When the equipment ID of the Sink has not been registered in the receiving equipment table (No in step S72), the Source transmits an AKE_CANCEL command indicating the interruption of the mutual authentication and key exchange procedure to the Sink in order to terminate the process. The Source can also include, in the AKE_CANCEL command, the information indicating that the Sink has not been registered in the receiving equipment table. The Sink can also be registered in the receiving equipment table before the key exchange.

On the other hand, when the equipment ID of the Sink has been registered in the receiving equipment table (Yes in step S72), the Source, next, confirms whether the equipment ID of the Sink has been registered in the connection table (step S73).

When the equipment ID of the Sink has not been registered in the connection table (No in step S73), the Source further confirms whether the connection table has space to record a new equipment ID (step S75). In the present embodiment, it is assumed that the Source uses a key counter to manage the number of the key IDs that can be recorded on the connection table, and that the connection table can record the IDs when the value of the key counter is lower than an upper limit value n. The Source regulates the value of the key counter to keep the same as the number of the key IDs recorded in the connection table.

When the value of the key counter has already reached the n (No in step S75), the Source transmits an AKE_CANCEL command indicating the interruption, of the mutual authentication and key exchange procedure to the Sink in order to terminate the process. The Source can also include, in the AKE_CANCEL command, the information indicating that the number of the entries registered in the connection table has reached the upper limit n.

When the value of the key counter is lower than the n (Yes in step S75), the Source adds one to the value of the key counter (step S76), generates an exchange key Kr for a remote access and a key ID for specifying the Kr (step S77), and adds the entry including the set of the exchange key Kr, the key ID, and the equipment ID of the Sink to the connection table (step S78).

When the equipment ID of the Sink has already been recorded in the connection table (Yes in step S73), the Source deletes the entry corresponding to the equipment ID from the connection table (step S74), newly generates an exchange key Kr for a remote access and a key ID for specifying the Kr (step S77), and adds the entry including the set of the exchange key Kr, the key ID, and the equipment ID of the Sink to the connection table (step S78). Note that, as another pattern, instead of deleting the entry corresponding to the equipment ID from the connection table, it is considered that the Source extracts the exchange key Kr and the key ID corresponding to the equipment ID from the connection table and does not add the information to the connection table again. However, the pattern is not illustrated in the drawings.

Then, after encrypting, according to the method prescribed by the DTCP specification, the exchange key Kr for a remote access that has been generated in step S77, the Source transmits the exchange key Kr together with the key ID to the Sink using an EXCHANGE_KEY command.

At the same time as transmitting the exchange key Kr to the Sink, the Source starts the management of the life of the exchange key Kr using a timer (step S79). Concretely, the Source makes available a timer corresponding to the key ID (in other words, makes available a timer for each of the key IDs stored in the connection table), sets a predetermined value (for example, a value corresponding to a minute), and starts counting down.

After that, the Source automatically reduces the value of the timer to zero at predetermined clocks. When the value of the timer reaches zero, the Source activates the process for updating the connection table.

Figure 8:
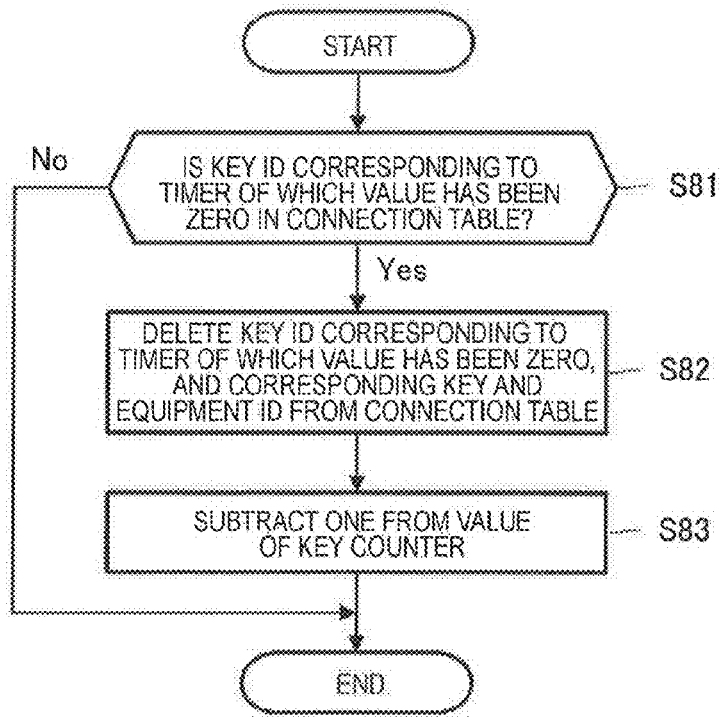
FIG. 8 is a view for illustrating an exemplary process for updating a connection table.

FIG. 8 illustrates an exemplary process for updating the connection tattle. Updating the connection table deletes, from the connection table, the entry including the key ID that has not periodically been received according to a key life management command (AKE_ALIVE. CMD).

The Source, first, checks whether an entry including the key ID corresponding to the timer of which value has been zero is in the connection table (seep S81). When such an entry is not in the connection table (No in step S81), the process is terminated.

When such an entry is in the connection table (Yes in step S81), the Source deletes, from the connection, table, the entry including the key ID corresponding to the timer of which value has been zero (step S82), and subtracts only one from the value of the key counter (step S83). As a result of that, the Source can newly exchange a key with another Sink (or the same Sink).

Note that, in consideration, of the delay due to a command communication, there may be operations, for example, an operation in which a margin is provided between the time when the value of the time becomes zero and the time when the exchange key is destroyed, or an operation in which the process illustrated in FIG. 8 is not performed until another Sink newly requests an exchange key.

While the Source manages the life of the exchange key Kr as described above, the Sink can request to update the life of the exchange key Kr in use.

Figure 9:
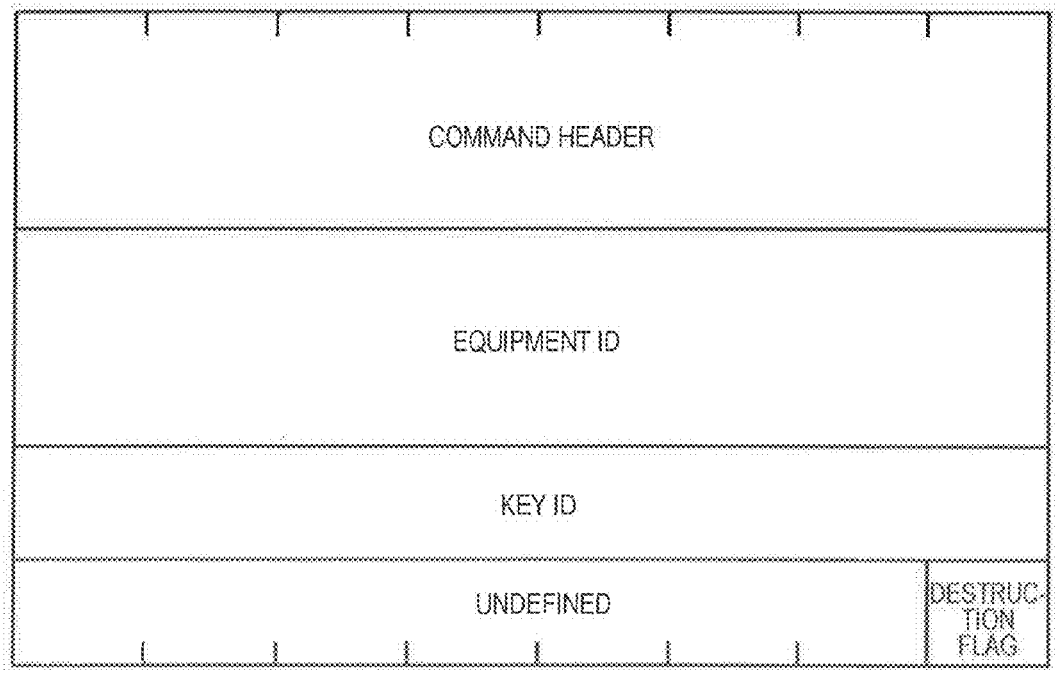
FIG. 9 is a view for illustrating an exemplary format of a KEEP_ALIVE command.

In the present embodiment, the Sink requests to update the life of the exchange key Kr by transmitting a KEEP_ALIVE command at predetermined transmission cycles. Further, the Source maintains the corresponding key by receiving the KEEP_ALIVE command at predetermined reception cycles. FIG. 9 illustrates an exemplary format of the KEEP_ALIVE command. In the example illustrated in the drawing, the KEEP_ALIVE command includes, in the payload, a field including an equipment ID that is the information for specifying the source Sink, and a field including a key ID that is the information for specifying the exchange key Kr of which life is to be requested to be updated. The last bit is used as a destruction flag indicating the destruction of the exchange key Kr.

When receiving the KEEP_ALIVE command, the Source returns a KEEP_ALIVE response after performing the process for updating the life. Note that, although it is omitted in the drawings, it is considered that the status field that is defined in the AKE Control Command Format in the DTCP is used for the response information of the KEEP_ALIVE response.

The Source sets a value indicating a predetermined time on the timer corresponding to the key ID included in the KEEP_ALIVE command received from the Sink in order to control the timer to newly count down from the value in order to update the life. Note that, even after the value of the timer has been zero, the process for updating the life is performed as long as the corresponding key has not been destroyed yet.

Figure 10:
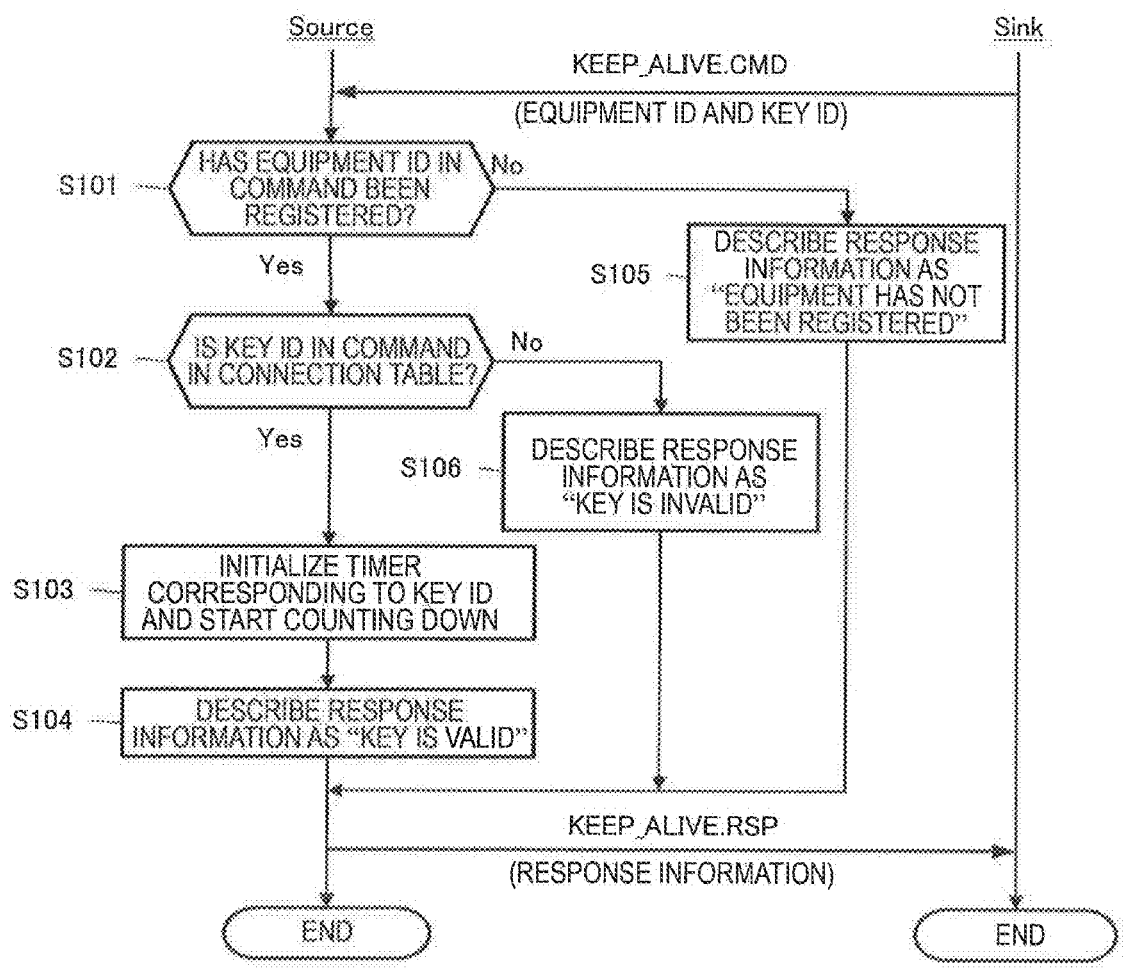
FIG. 10 is a view for illustrating an exemplary operation sequence that is for updating the life of an exchange key Kr and that is performed between the Source and the Sink.

FIG. 10 illustrates an exemplary operation sequence that is for updating the life of an exchange key Kr and that is performed between the Source and the Sink. When receiving an exchange key Kr and its key ID from the Source, the Sink transmits a KEEP_ALIVE command at predetermined transmission cycles.

When receiving the KEEP_ALIVE command from the Sink, the Source confirms whether the equipment ID included in the command has been registered in the receiving equipment table (step S101).

When the equipment ID in the KEEP_ALIVE command has not been registered in the receiving equipment table (No in step S101), the Source describes the response information as "the equipment has not been registered" (step S105), and transmits a KEEP_ALIVE response including the response information to the Sink that is the requestor in order no terminate the process.

On the other hand, when the equipment ID in the KEEP_ALIVE command has been registered in the receiving equipment table (Yes in step S101), the Source subsequently confirms whether the key ID in the KEEP_ALIVE command is in the connection table (step S102).

When the key ID in the KEEP_ALIVE command is not in the connection table (No in step S102), the Source describes the response information as "the key is invalid" (step S106), and transmits a KEEP_ALIVE response including the response information to the Sink that is the requestor in order to terminate the process.

When the key ID in the KEEP_ALIVE command is in the connection table (Yes in step S102), the Source initialises the value of the timer corresponding to the key ID using a value indicating a predetermined time in order to start counting down again (step S103). Then, the Source describes the response information as "the key is valid" (step S104), and transmits a KEEP_ALIVE response including the response information to the Sink that is the requestor in order to terminate the process.

After the completion of the mutual authentication and key exchange procedure with the Source, the Sink repeatedly transmits the KEEP_ALIVE command at the transmission cycles in a predetermined period as long as it is necessary to maintain the obtained exchange key Kr.

Further, when the exchange key Kr has been unnecessary because of the completion of the communication with the Source (content reception), the Sink can request the destruction of the exchange key Kr from the Source. Deleting the appropriate entry from the connection table newly connects other Sinks to the Source within the upper limit number n so that the Source can perform a communication (content transmission).

The Sink can request the destruction of the exchange key Kr from the Source, for example, by including the information requesting the destruction of the exchange key Kr in the KEEP_ALIVE command to be transmitted at predetermined transmission cycles. In the exemplary format of the KEEP_ALIVE command illustrated in FIG. 9, the payload includes a destruction flag. Setting the destruction flag can indicate the destruction of the exchange key Kr.

Figure 11:
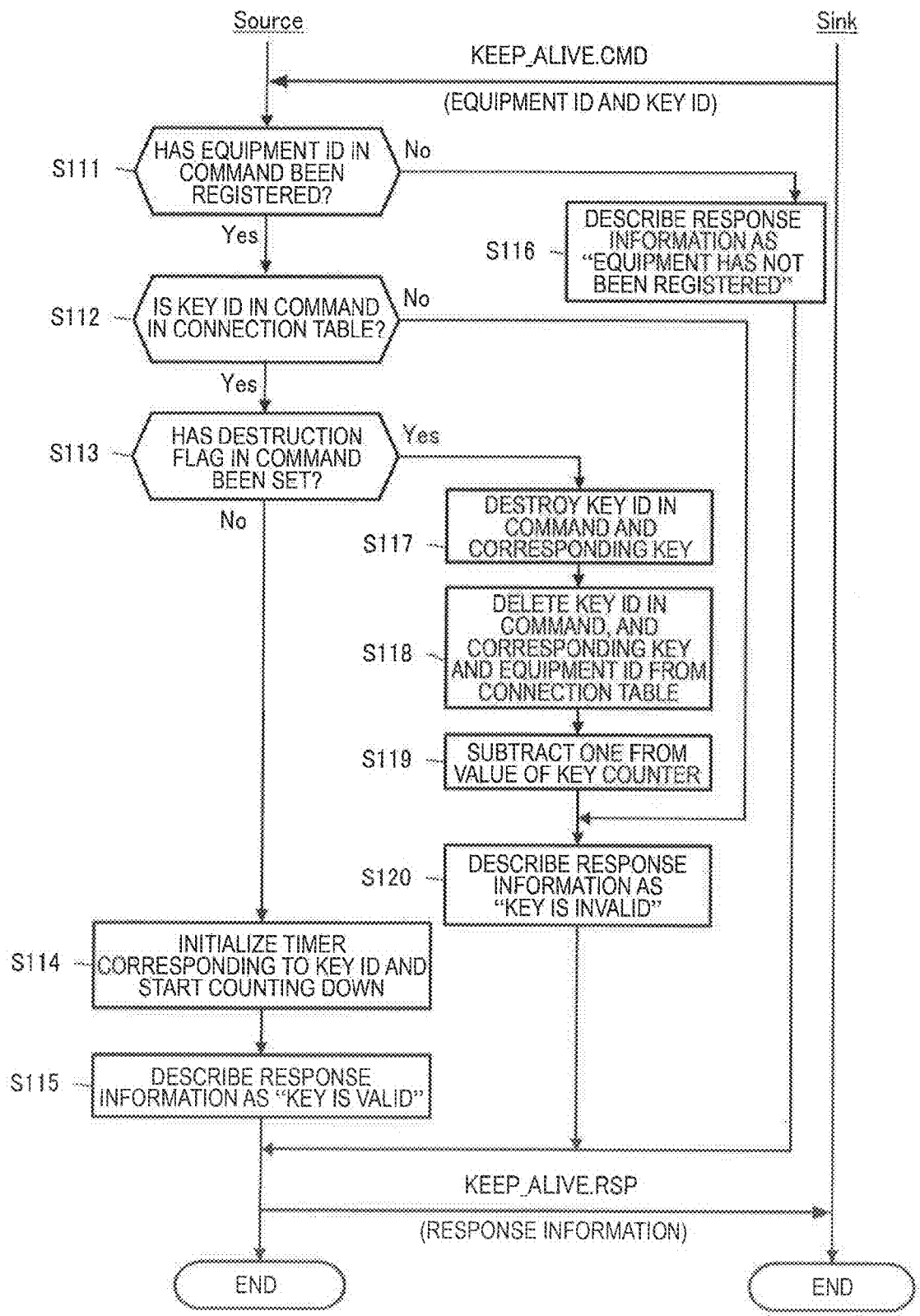
FIG. 11 is a view for illustrating another exemplary operation sequence that is for updating the life of the exchange key Kr and that is performed between the Source and the Sink.

FIG. 11 illustrates another exemplary operation sequence that is for updating the life of the exchange key Kr and that is performed between the Source and the Sink. The operation sequence illustrated in the drawing differs from the operation sequence illustrated, in FIG. 10 in that the operation sequence illustrated in the drawing includes the process for destroying the unnecessary exchange key Kr.

When receiving a KEEP_ALIVE command from the Sink, the Source confirms whether the equipment ID included in the command has been registered in the receiving equipment table (step S111).

When the equipment ID in the KEEP_ALIVE command has not been registered in the receiving equipment table (No in step S111), the Source describes response information as "the equipment has not been registered" (step S116), and transmits a KEEP_ALIVE response including the response information to the Sink that is the requestor in order to terminate the process.

On the other hand, when the equipment ID in the KEEP_ALIVE command has been registered in the receiving equipment table (Yes in step S111), the Source subsequently confirms whether the key ID in the KEEP_ALIVE command is in the connection table (step S112).

When the key ID in the KEEP_ALIVE command is not in the connection table (No in step S112), the Source describes the response information as "the key is invalid" (step S120), and transmits a KEEP_ALIVE response including the response information to the Sink that is the requestor in order to terminate the process.

On the other hand, when the key ID in the KEEP_ALIVE command is in the connection table (Yes in step S112), the Source further confirms whether the destruction flag in the KEEP_ALIVE command is set (step S113).

When the destruction flag in the KEEP_ALIVE command is set (Yes in step S113), the Source destroys the key ID in the command and the exchange key corresponding to the key ID (step S117), deletes the entry including the key ID in the command, the corresponding exchange key, and the equipment ID from the connection table (step S118), and subtracts only one from the value of the key counter (step S119). Then, the Source describes the response information as "the key is invalid" (step S120), and transmits a KEEP_ALIVE response including the response information to the Sink that is the requestor in order to terminate the process.

On the other hand, when the destruction flag in the KEEP_ALIVE command is not set (No in step S113), the Source initializes the value of the timer corresponding to the key ID using a value indicating a predetermined time in order to start counting down again (step S114). Then, the Source describes the response information as "the key is valid" (step S115), and transmits a KEEP_ALIVE response including the response information to the Sink that is the requestor in order to terminate the process.

According to the operation sequences illustrated in FIGS. 10 and 11, even though it is necessary to strictly limit the number of content using apparatuses (Sinks) that use content at the same time in a case where the content in a content providing apparatus (Source) positioned at home is used from the outside, each of the content using apparatuses that has performed the mutual authentication and key exchange procedure with the content providing apparatus transmits a KEEP_ALIVE command at predetermined transmission cycles of each content using apparatuses. Thus, the content providing apparatus can accurately obtain the exchange key to be maintained, and can newly communicate with another content using apparatus by destroying an unnecessary exchange key.

Because the content providing apparatus manages the exchange key to be maintained using a key ID, the content pro voiding apparatus can unaffectedly perform a process even though the content, using apparatus has changed its address during a mobile communication.

INDUSTRIAL APPLICABILITY

Hereinabove, with reference to the specific embodiments, the present invention has been described in detail. However, it is obvious that a person with an ordinary skill in the art can modify or alter the embodiments without departing from the gist of the invention.

As an exemplary application of the present invention, a communication system for using content by remotely accessing a server on a home network applying the DTCP-IP from a client outside the house can be cited. However, the gist of the present invention is not limited to a communication system applying the DTCP-IP or a communication system for remotely accessing consent. Similarly, the present invention can be applied to a communication system for transmitting content within a range of the user's legitimate use while limiting the number of equipment to which content that requires a protection for a copyright or another purpose is transmitted at the same time.

In summary, the contents described herein shall not be interrupted to a limited extent because the present invention has been disclosed as examples. To judge the gist of the present invention, the scope of claims should be taken in consideration.

REFERENCE SIGNS LIST

10 Content providing apparatus (RA-source)
11 CPU
12 Content receiving/replaying unit
13 Communication unit
14 Storage unit
15 Timer
20 Content using apparatus (RA-sink)
21 CPU
22 Communication unit
23 Content output unit
24 Storage unit 25 Timer
30, 31 Router
40, 41 Modem
50 WAN
60 IAS service
70 DDNS service

The invention claimed is:

1. A communication apparatus, comprising:
circuitry configured to:
  register a sink apparatus with a first piece of identification information associated with the sink apparatus;
  receive a key and a challenge signal in a challenge and response procedure;
  store the key according to a result of a comparison between the first piece of identification information and a second piece of identification information that is transmitted with the challenge signal;
  start a timer to maintain the key;
  erase the key according to a time value, counted by the timer, compared to a predetermined time value;
  maintain a number count representing a number of registered sink apparatuses;
  increase the number count when a new sink apparatus is registered; and
  stop registering new sink apparatuses according to a number value, of the number count, compared to a predetermined number value.

2. The communication apparatus of claim 1, wherein the circuitry is further configured to:
  receive a key-life updating request from the sink apparatus;
  determine whether the key has been erased; and
  update the time value counted by the timer in response to the key-life updating request when the key has not been erased.

3. The communication apparatus of claim 1, wherein the circuitry is further configured to decrease the number count when a key corresponding to one of the registered sink apparatuses is erased.

4. A communication apparatus, comprising:
circuitry configured to:
  register a sink apparatus with a first piece of identification information associated with the sink apparatus;
  receive a key and a challenge signal in a challenge and response procedure;
  store the key according to a result of a comparison between the first piece of identification information and a second piece of identification information that is transmitted with the challenge signal;
  start a timer to maintain the key;
  erase the key according to a time value, counted by the timer, compared to a predetermined time value;
  transmit content information in response to a HTTP request using HTTP POST by the sink apparatus when the key is not erased;
  maintain a number count representing a number of registered sink apparatuses;
  increase the number count when a new sink apparatus is registered; and
  stop registering new sink apparatuses according to a number value, of the number count, compared to a predetermined number value.

5. The communication apparatus of claim 4, wherein the circuitry is further configured to:
  receive a key-life updating request from the sink apparatus;
  determine whether the key has been erased; and
  update the time value counted by the timer in response to the key-life updating request when the key has not been erased.

6. The communication apparatus of claim 4, wherein the circuitry is further configured to decrease the number count when a key corresponding to one of the registered sink apparatuses is erased.

7. A communication apparatus, comprising:
circuitry configured to:
  register a sink apparatus with a first piece of identification information associated with the sink apparatus;
  receive a key and a challenge signal in a challenge and response procedure;
  store the key according to a result of a comparison between the first piece of identification information and a second piece of identification information that is transmitted with the challenge signal;
  start a timer to maintain the key;
  erase the key according to a time value, counted by the timer, compared to a predetermined time value;
  transmit content information in response to a HTTP request using HTTP GET by the sink apparatus when the key is not erased;
  maintain a number count representing a number of registered sink apparatuses;
  increase the number count when a new sink apparatus is registered; and
  stop registering new sink apparatuses according to a number value, of the number count, compared to a predetermined number value.

8. The communication apparatus of claim 7, wherein the circuitry is further configured to decrease the number count when a key corresponding to one of the registered sink apparatuses is erased.

9. The communication apparatus of claim 7, wherein the circuitry is further configured to:
  receive a key-life updating request from the sink apparatus;
  determine whether the key has been erased; and
  update the time value counted by the timer in response to the key-life updating request when the key has not been erased.

10. A non-transitory computer-readable medium storing computer executable instructions that, when executed by circuitry of a computer operating as a content providing apparatus in a communication system that performs a communication for transmitting content between the content providing apparatus for providing the content and a content using apparatus for using the content, cause the computer to:
  register the content using apparatus with a first piece of identification information associated with the content using apparatus;
  receive a key and a challenge signal in a challenge and response procedure;
  store the key according to a result of a comparison between the first piece of identification information and a second piece of identification information that is transmitted with the challenge signal;
  start a timer to maintain the key;
  erase the key according to a time value, counted by the timer, compared to a predetermined time value;
  maintain a number count representing a number of content using apparatuses;

increase the number count when a new content using apparatus is registered; and stop registering new content using apparatuses according to a number value, of the number count, compared to a predetermined number value.

\* \* \* \* \*